United States Patent [19]

Hoffman et al.

[11] 3,796,893

[45] Mar. 12, 1974

[54] PERIPHERAL CIRCUITRY FOR DYNAMIC MOS RAMS

[75] Inventors: Charles Robert Hoffman, Tempe, Ariz.; Donald H. Kube, San Jose, Calif.

[73] Assignee: Motorola, Inc., Franklin Park, Ill.

[22] Filed: Aug. 28, 1972

[21] Appl. No.: 284,183

[52] U.S. Cl. ................ 307/205, 307/214, 307/251, 307/304

[51] Int. Cl. .......................................... H03k 19/08

[58] Field of Search........ 307/205, 221 C, 251, 279, 307/304, 214

[56] References Cited

UNITED STATES PATENTS

| | | | |
|---|---|---|---|
| 3,553,541 | 1/1971 | King | 307/251 |
| 3,555,307 | 1/1971 | Hujita | 307/304 |
| 3,593,036 | 7/1971 | Ma | 307/279 |
| 3,629,612 | 12/1971 | Harbert | 307/304 |
| 3,683,202 | 8/1972 | Schmidt | 307/205 |

*Primary Examiner*—Rudolph V. Rolinec
*Assistant Examiner*—Ro E. Hart
*Attorney, Agent, or Firm*—Vincent J. Rauner; Charles R. Hoffman

[57] ABSTRACT

Improved circuits for a dynamic MOS RAM having a storage array of inverting storage cells, including an improved input buffer, an improved write circuit, and a sense circuit. The input buffer circuit includes a dynamic latch circuit clocked by the first clock complement signal and is compatible with TTL logic levels. The cross coupled gate nodes of the dynamic latch are conditionally discharged by circuitry which includes a ratio type first address inverter, and a second ratio type address inverter followed by a third ratioless inverter, whose output conditionally discharges one of the cross coupled gate nodes of the dynamic latch. A separate write circuit drives each digit-sense column bus line, and includes a push-pull driver clocked by the third clock input signal. The pull-up and pull-down field effect transistors of the push-pull driver each have an exclusive OR type circuit for conditionally discharging the precharged gate electrodes of the pull-up and pull-down field effect transistors, depending on the voltages on the data input signal and the data control signal. The ratioless data control inverter and the data input inverter provide the complement signals required by the two exclusive OR type circuits.

5 Claims, 10 Drawing Figures

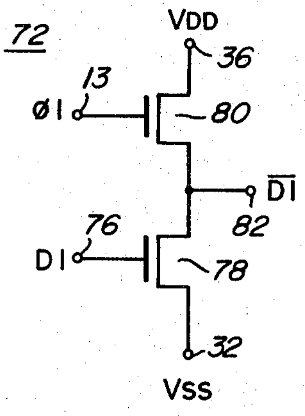
FIG. 2b
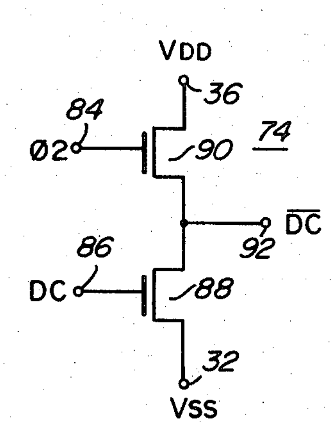
FIG. 2c
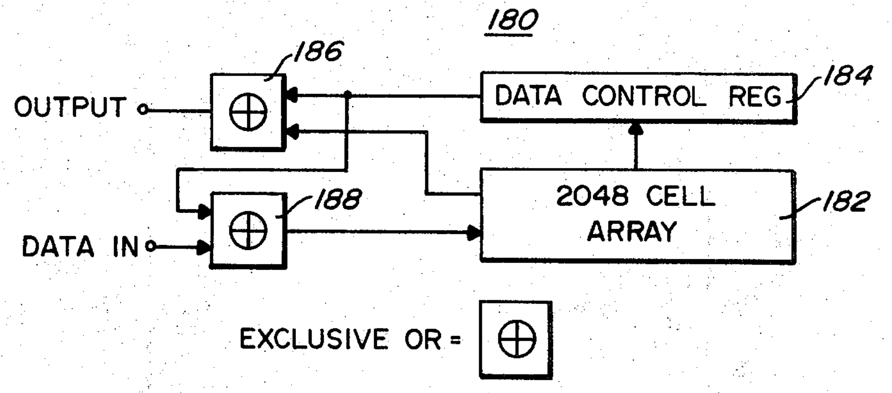
FIG. 6a
READ CYCLE
| DATA STORED | DATA CONTROL | OUTPUT DATA |
|---|---|---|
| 0 | 0 | 0 |
| 0 | 1 | 1 |
| 1 | 0 | 1 |
| 1 | 1 | 0 |
WRITE CYCLE
| INPUT DATA | DATA CONTROL | DATA STORED |
|---|---|---|
| 0 | 0 | 0 |
| 0 | 1 | 1 |
| 1 | 0 | 1 |
| 1 | 1 | 0 |
FIG. 6b

PERIPHERAL CIRCUITRY FOR DYNAMIC MOS RAMS

BACKGROUND

This invention relates generally to MOS semiconductor memory systems and particularly to peripheral circuitry for interfacing with bipolar input signals and bipolar sense amplifiers.

MOS dynamic random access memories (RAMs) have provided the lowest cost semiconductor memory storage yet achievable. Recent research in the area of MOS dynamic RAMs has led to steadily increasing bit density and faster access times, but these features have been gained at the expense of other qualities including power dissipation, compatibility with bipolar logic circuits, types of clocking systems, and packaging considerations, all of which add, in the final analysis, to memory system cost. Memories using storage cells utilizing the inverting cell concept have been designed which reduce the power and the storage area by a factor of approximately two over previous devices, and allow read cycles to be shorter than read-write cycles when a refresh cycle is required. However, the write circuitry and the read circuitry are conceptually different for inverting cell memories than for non-inverting cell memories. Since conventional bipolar integrated logic circuits operate at low voltage logic levels (for example, the typical worst case "1" level for a TTL gate is 2.4 volts at an output current of several milliamperes), and since MOS integrated circuits typically operate at logic levels of the order of 10 to 15 volts, it is necessary to provide input buffer circuits on the MOS chip capable of converting bipolar logic levels to MOS logic levels. Since the threshold voltage $V_{TO}$ of the MOS transistors used in MOS integrated circuits is low (typically 1.5 to 2.5 volts) the problem of designing buffer circuits which efficiently accomplish the required amplification has evaded a clear-cut solution. A number of specialized input buffer circuits are found in the prior art, most of which are functional but marginally adequate for most applications. In general, such MOS input buffer circuits have suffered from a number of shortcomings, including high DC power dissipation, requiring more than one clock input for operation, and requiring pull-up resistive devices either on or off the chip in order to achieve sufficiently large input voltages to make the input buffer function properly.

Previous write circuits for dynamic MOS RAMs using the inverting cell concept have required two data input terminals (a data input terminal and a data input complement terminal) in order to achieve satisfactory speed performance. This requires an extra package lead, which, in turn, requires additional external logic in the memory system to provide the complement signal and increases the number of external connections with a resulting decrease in reliability of the overall memory system.

SUMMARY OF THE INVENTION

Briefly described, the invention provides peripheral input buffer circuits and write circuits for inclusion on a dynamic MOS RAM chip for permitting direct connection to TTL logic circuits which provide the binary address inputs and the data input signal for a dynamic MOS RAM which utilizes the inverting cell concept and operates from a three phase clock system. The address input buffer utilizes only the first clock input signal and a complement of the first clock input signal generated on the memory chip. A dynamic latch therein includes two cross-coupled gate electrode pairs, which are precharged by the first clock input signal and are conditionally discharged during the delay time between the trailing edge of the first clock input signal pulse and the leading edge of the internally generated complement pulses by novel circuitry which inverts the low level input logic level and conditionally discharges one of the cross coupled gate electrode nodes, depending on the logic level applied to the input. When the internally generated complement rises to a logical "one" level, the dynamic latch then provides the address and address complement logic levels at voltage levels adequate for MOS circuitry.

The write circuit of the present invention includes a push-pull buffer and two circuits, one providing an exclusive OR function of the data control signal and the data input signal, and the other providing an exclusive NOR function of the data control signal and the data input signal. The third clock input signal is used to eliminate potentially harmful race conditions in the exclusive OR type circuits. The complement of the data input signal required by the exclusive OR type circuits is provided by a ratioless inverter clocked by the first clock input signal. The data control complement signal required by the exclusive OR type circuit is generated during the second clock signal pulse by a ratio type inverter.

The particular circuit configuration used for the input buffer of the present invention provides higher speed operation than any previous circuits, in that the circuit permits the use of a narrow pulse from the first clock input signal, which greatly reduces the power dissipation component of the address input buffers of the dynamic RAM.

In view of the foregoing, it is an object of this invention to provide improved circuity for dynamic MOS random access memories.

It is a further object of this invention to provide an improved input buffer compatible with TTL logic levels for dynamic MOS random access memories.

It is yet another object of this invention to provide an improved write circuit for dynamic MOS RAMs using inverting cell concept.

BRIEF DESCRIPTION OF THE FIGURES

FIG. 2*b* is a schematic diagram of a data input inverter used in conjunction with the write circuit of FIG. 2*a*.

FIG. 2*c* is a schematic diagram of a data control inverter used in conjunction with the write circuit of FIG. 2*a*.

FIG. 6*a* shows a block diagram used in explaining the inverting cell concept.

FIG. 6*b* shows a truth table describing the logic operations of the input and output circuits for a memory using the inverting cell concept.

DESCRIPTION OF THE INVENTION

Figure 1:
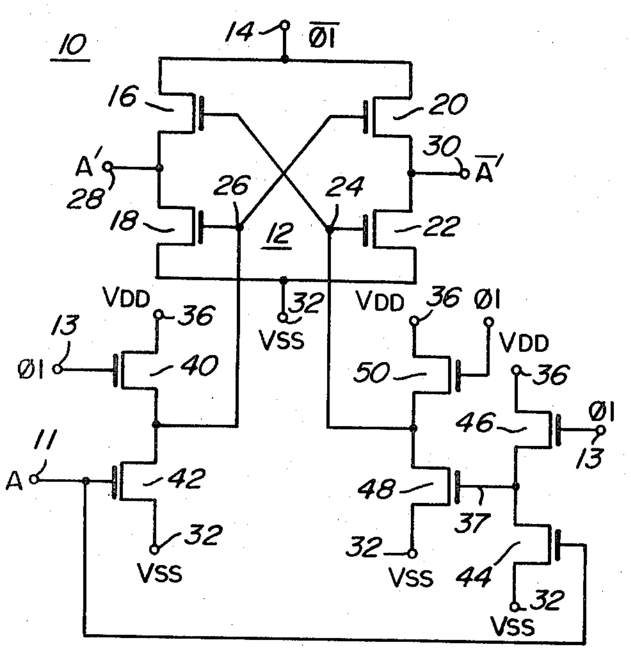
FIG. 1 is a circuit schematic of the preferred embodiment of the input buffer according to the present invention.

In the schematic diagram in FIG. 1, input buffer 10 has an input terminal 11, and provides amplified complementary logical outputs on nodes 28 and 30. Input buffer 10 operates from a single $\phi_1$ clock signal bus 13 and from the logical complement of $\phi_1$ designated $\overline{\phi}_1$. Output nodes 28 and 30 are derived from dynamic latch 12, which includes cross-coupled MOSFETs 16 and 18, which are connected in series connection between $V_{SS}$ power supply bus 32 and $\overline{\phi}_1$ bus 14, and from MOSFET 20 and MOSFET 22, which are connected in series between $\overline{\phi}_1$ bus 14 and $V_{SS}$ bus 32.

Those skilled in the art will appreciate that the acronym MOSFET is widely understood to include all insulated gate field effect transistors within the scope of its meaning, and this is also the intent in the description herein of this invention. It will be readily recognized by those skilled in the art that the circuits described herein may be fabricated with P channel MOSFETs or with N channel MOSFETs (but not both, as in CMOS circuits). In the embodiments described herein, and for the timing diagram in FIG. 5 the MOSFETs are assumed to be P channel. However, N channel implementations of the shown embodiments are included within the intention of the present invention. In the timing diagram, of FIG. 5 and in the discussion of the operation of the embodiments presented herein, $V_{SS}$ is assumed to be +5 volts and $V_{DD}$ is assumed to be −15 volts. An input "one" level is assumed to be +3 volts and an input "zero" level is assumed to be 0 volts. Further, for conciseness, in the description of the operation, a MOS "one" level is assumed to be −15 volts and a MOS "zero" level is assumed to be +5 volts.

It is also well known to those skilled in the art that a MOSFET is a bilateral device having two main electrodes which may interchangeably function as source and drain electrodes, depending on which is at the more positive voltage. The convention adopted for the description herein is that the main electrodes will each be identified as source or a drain, although it is understood that during circuit operation an electrode identified herein as a source may well function as a drain part of the time.

Returning to the description of the input buffer 10, in FIG. 1, it is seen that the gate electrodes of MOSFETs 16, 18, 20 and 22 are cross-coupled so that the gate electrode of MOSFET 18 and the gate electrode of MOSFET 20 are joined at node 26 and the gate electrode of MOSFET 16 and gate electrode of MOSFET 22 are connected at node 24. Node 26 is connected to the output of a ratio type inverter including a load device 40, which is clocked by $\phi_1$, and which has its drain electrode connected to $V_{DD}$ supply bus 36 and its source electrode connected to node 26 and also to the drain electrode of MOSFET 42, which has its source electrode connected to $V_{SS}$ supply bus 32, and its gate electrode connected input node 11. Input node 11 is also connected to the gate electrode of MOSFET 44, which is the switch device of a second ratio type inverter having MOSFET 46 as a load device. The source of MOSFET 44 is connected to $V_{SS}$ supply bus 32 and the drain electrode thereof is connected to the source electrode of MOSFET 46, which has its gate electrode connected to $\phi_1$ bus 13 and its drain electrode connected to $V_{DD}$ supply bus 36, and its output terminal 37 connected to the gate electrode of MOSFET 48. MOSFET 48 is the switch device of a ratioless inverter having its source electrode connected to $V_{SS}$ supply bus 32 and its drain electrode connected to node 24 and to the source electrode of MOSFET 50, which has its gate electrode connected to $\phi_1$ bus 13 and its drain electrode connected to $V_{DD}$ bus 36.

Figure 3:
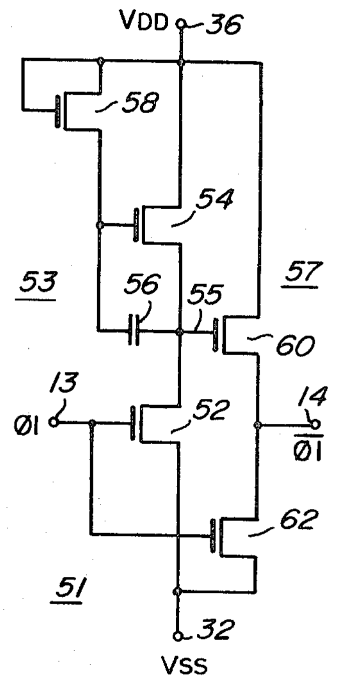
FIG. 3 is a schematic diagram of the clock inverter used in conjunction with input buffers such as shown in FIG. 1.

In the preferred embodiment, the optimization of the circuit design of input buffer 10 is intimately associated with that of clock inverter 51, shown in FIG. 3. Clock inverter 51 includes a bootstrap inverter 53, which includes switching transistor 52 having its gate electrode connected to $\phi_1$, and load device 54 and bootstrap capacitor 56, which in conjunction with MOSFET 58, maintains a relatively constant gate-to-source voltage across load device 54. The output 55 of bootstrap inverter 53 is connected to the gate of MOSFET 60, which is the pull-up device for push-pull driver 57. The pull-down MOSFET 62 of push-pull driver 57 has its gate electrode also connected to $\phi_1$. The output of push-pull driver 57 is node 14, which provides the $\overline{\phi}_1$ signal.

Figure 5:
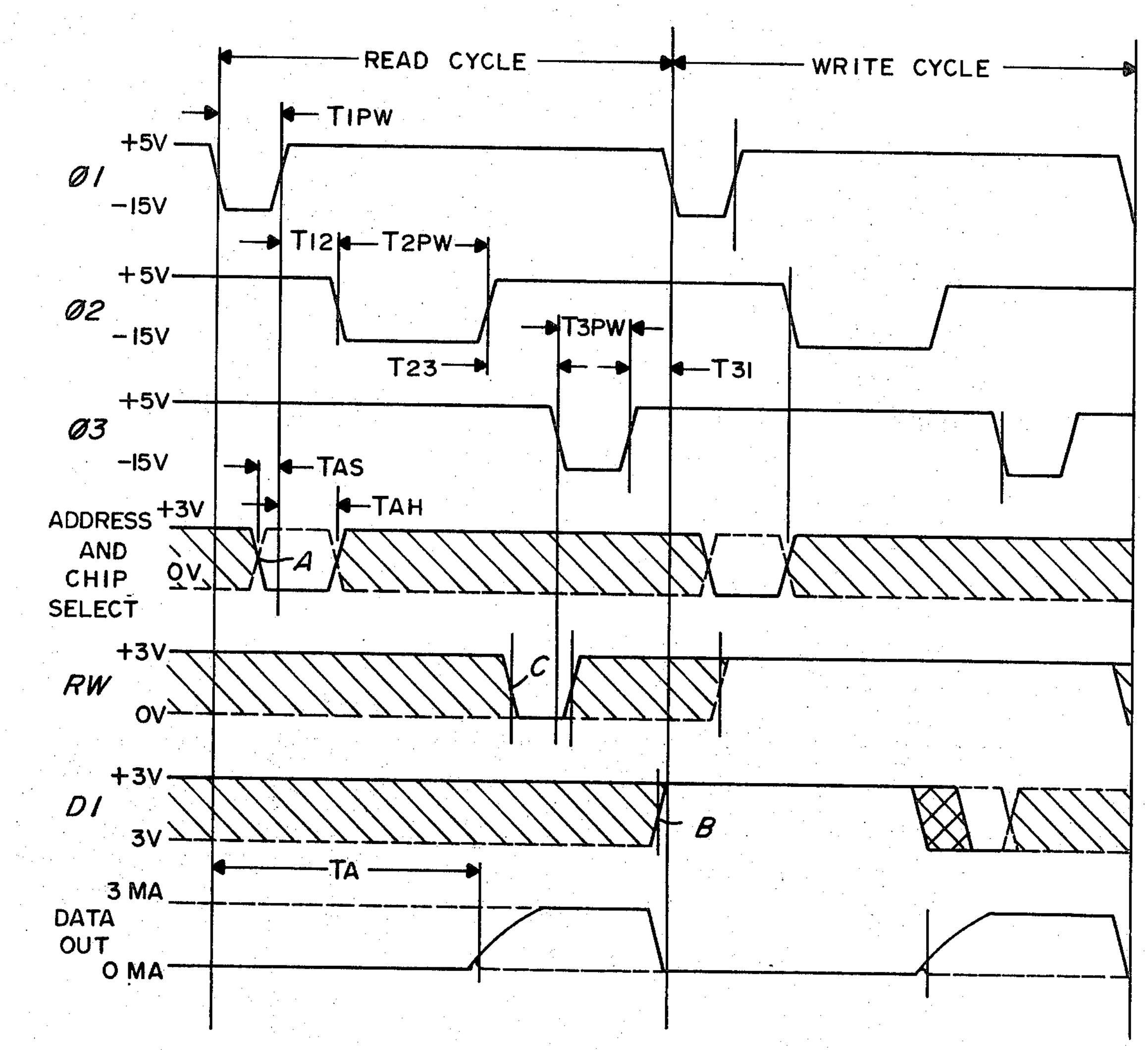
FIG. 5 is a timing diagram for the dynamic MOS RAM shown in FIG. 4.

The operation of the input buffer shown in FIG. 1 is best described with reference to the timing diagram shown in FIG. 5 and the schematic diagram of the clock inverter shown in FIG. 3. Referring first to FIG. 5, it is seen that during $T_{1PW}$, node 14 of input buffer 10 (referring again to FIG. 1) is at +5 volts, and nodes 26 and 24 are precharged to a "one" level through precharge devices 40 and 50. Thus, output nodes 28 and 30 are discharged to +5 volts through MOSFETs 18 and 22, and also through MOSFETs 16 and 20, and also through MOSFET 62 of FIG. 3 during $T_{1PW}$. Referring to FIG. 3, it is seen that during $T_{1PW}$ the output node 14 of clock inverter 51 is at about +5 volts because MOSFET 62 is on, and MOSFET 60 is off because node 55 is at +5 volts, since MOSFET 52 is on. When the trailing edge of $\phi_1$ undergoes its transition from −15 volts to +5 volts, MOSFETS 52 and 62 are turned off, and MOSFET 54 supplies a relatively constant current by virtue of bootstrapping action of bootstrap capacitor 56. Thus, pull-up device 60 is turned on, thereby charging the capacitance of node 14 ($\overline{\phi}_1$) to approximately −15 volts. Referring to FIG. 5, it is seen that the leading edge of an address input or chip select input occurs prior to the trailing edge of the $\phi_1$ pulse. It will be apparent to those skilled in the art that a substantial delay will occur between the trailing edge of the $\phi_1$ pulse and the leading edge of the $\overline{\phi}_1$ pulse generated by clock inverter 51. Assuming that at point A of the address input waveform input 11 goes from 3 volts to 0 volts, and, referring back to FIG. 1, it is seen that node 26 is discharged by MOSFET 42, so that MOSFETs 18 and 20 are off. Then, when $\overline{\phi}_1$ makes its transition from +5 volts to −15 volts, node 28 will also make a negative transition from +5 volts to about −15 volts, because node 24 is still at −15 volts since MOSFET 48 is held off by MOSFET 44. Node 30 remains at +5 volts, since MOSFET 22 remains on. If, at point A of the address input waveform on the timing diagram, input terminal 11 goes to 3 volts, then node 26 remains charged to its negative precharge level of −15 volts, since MOSFET 42 is off, MOSFET 44 remains off, and node 37 remains at the precharged level of −15 volts. MOSFET 48 remains on, and node 24 is discharged to +5 volts during the delay between the trailing edge of $\phi_1$ and the leading edge of $\overline{\phi}_1$, so that node 28 stays at +5 volts, since MOSFET 18 is on, and node 30 follows $\overline{\phi}_1$ to about −15 volts, since MOSFET 20 is on.

Figure 2A:
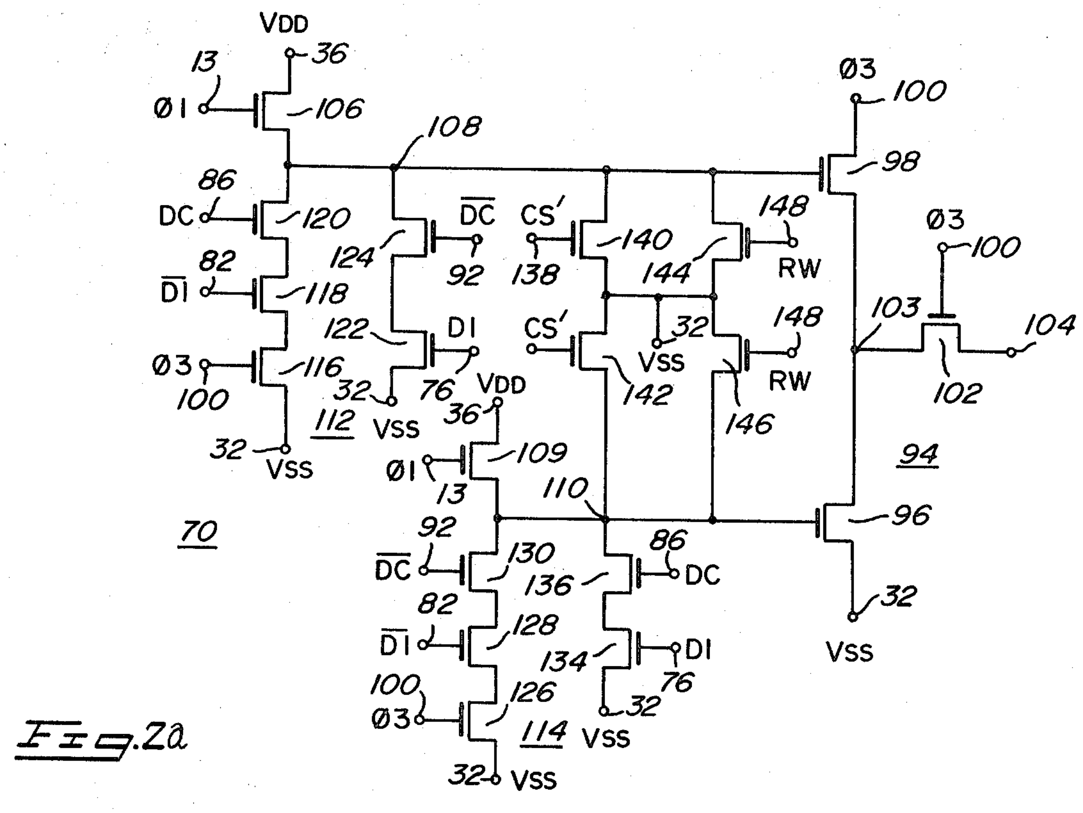
FIG. 2*a* is a schematic diagram of a preferred embodiment of a write circuit used in a dynamic MOS RAM using the inverting cell concept.

In FIG. 2*a* the preferred embodiment of the write circuit 70 is shown. The operation of write circuit 70 is intimately associated with the operation of data input inverter 72 shown in FIG. 2*b* and the data control inverter 74 shown in FIG. 2*c*. Referring to FIG. 2*b*, a data input signal DI is applied to the gate electrode 76 of switch MOSFET 78 of data inverter 72. The load MOSFET 80 has its gate electrode connected to node 13 and has its drain electrode connected to $V_{DD}$ supply bus 36, and its source electrode connected to the node 32. Referring to FIG. 2*c*, the data control signal bus 86 is applied to the gate electrode of MOSFET 88 which has its source electrode connected to $V_{SS}$ supply bus 32 and its drain electrode connected to the source electrode of load MOSFET 90 which has its drain electrode connected to $V_{DD}$ supply bus 36, and its gate electrode connected to $\phi_2$ signal bus 84. The output of data control inverter 74 is $\overline{DC}$ signal bus 92. Referring to FIG. 2*a* it is seen that write circuit 70 includes an output push-pull driver 94 which includes a pull-up device 98, a pull-down device 96, and a transmission gate MOSFET 102, which has its first main electrode connected to digit-sense column bus 104 and its second main electrode connected to the node 103. The drain of MOSFET 96 and the source of MOSFET 98 are also connected to node 103. The source of MOSFET 96 is connected to $V_{SS}$ supply bus 32 and the gate electrode of MOSFET 96 is connected to node 110. The gate of MOSFET 98 is connected to node 108 and the drain of MOSFET 98 is connected to $\phi_3$ signal bus 100. Node 108 is precharged during the $\phi_1$ pulse by precharge MOSFET 106, which has its gate electrode connected to $\phi_3$ signal bus 13 and its drain electrode connected to $V_{DD}$ supply bus 36 and its source electrode connected to node 108. Similarly, node 110 is precharged to approximately $V_{DD}$ volts, the $\phi_1$ pulse by precharge MOSFET 109, which has its gate electrode connected to $\phi_1$ signal bus 13, its drain electrode connected $V_{DD}$ supply bus 36, and its source electrode connected to node 110. Node 108 is conditionally discharged to +5 volts during or prior to the $\phi_3$ pulse by exclusive OR discharge circuit 112, which includes the series connection of MOSFETs 116, 118, and 120, having their respective gate electrodes connected to $\phi_3$ signal bus 100, $\overline{DI}$ signal bus 82, and DC signal bus 86. The source electrode of MOSFET 116 is connected to $V_{SS}$ supply bus 32. Also connected to node 108 is the series connection of MOSFETs 122 and 124, providing a conditional discharge path to $V_{SS}$ supply bus 32. The gate electrode of MOSFET 122 is connected to DI signal terminal 76. The gate electrode of MOSFET 124 is connected to $\overline{DC}$ signal bus 92. In a similar manner, node 110 is conditionally discharged to +5 volts by exclusive NOR circuit 114, which includes the series connection of MOSFETs 126, 128, and 130 between node 110 and $V_{SS}$ supply bus 32, and also the series connection of MOSFETs 136 and 134 providing a parallel path to $V_{SS}$ supply bus 32. The gate electrodes of MOSFETs 126, 128, and 130 are connected, respectively, to $\phi_3$ signal bus 100, $\overline{DI}$ bus 82, and $\overline{DC}$ bus 92. The gate electrodes of MOSFETs 134 and 136 are connected to DI signal bus 76 and DC signal bus 86, respectively.

Figure 4A:
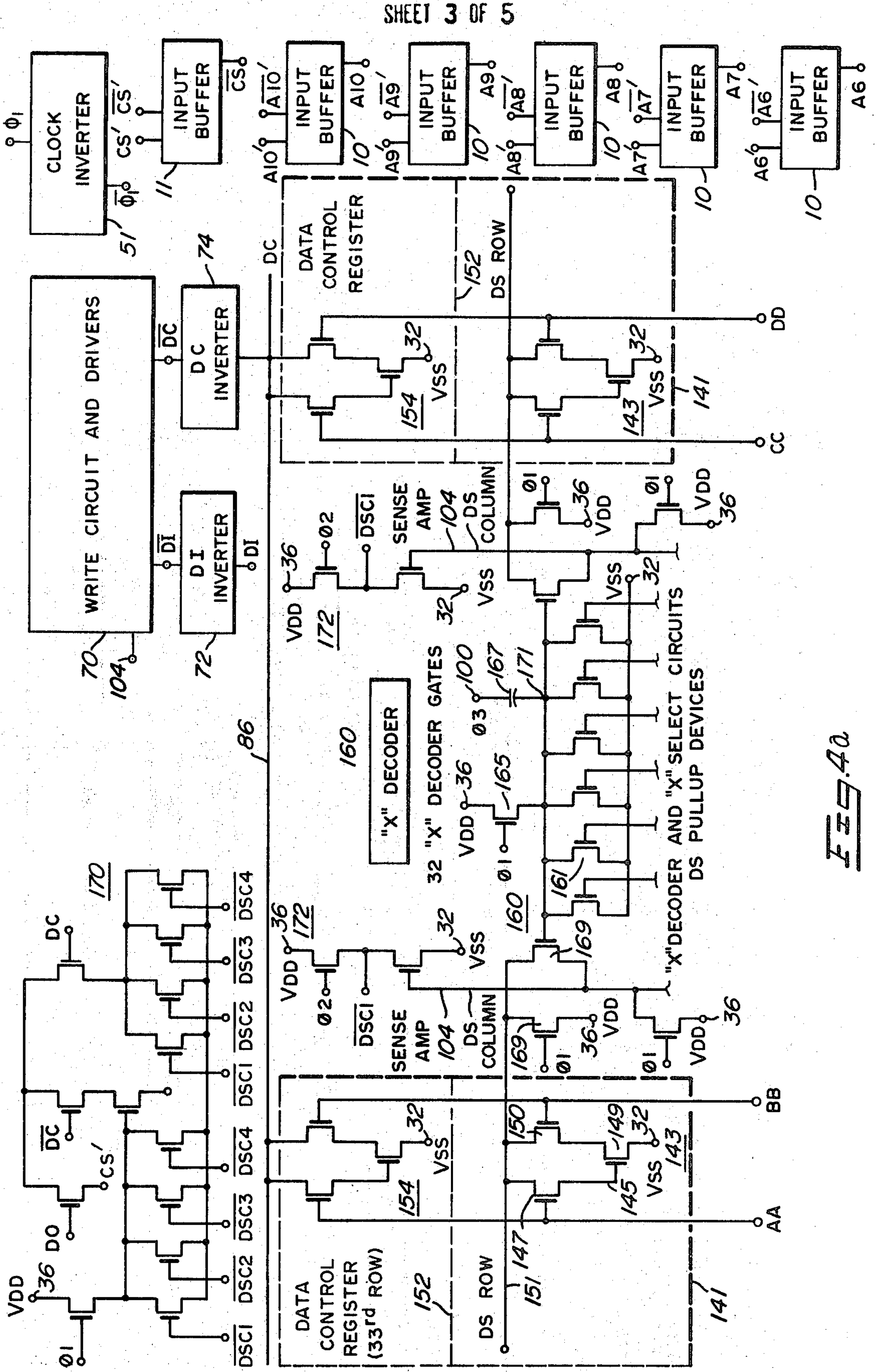
FIG. 4*a* is a partial schematic of a monolithic 2048 bit MOS dynamic RAM, which is the preferred embodiment of the improved peripheral circuitry of the present invention.
Figure 4B:
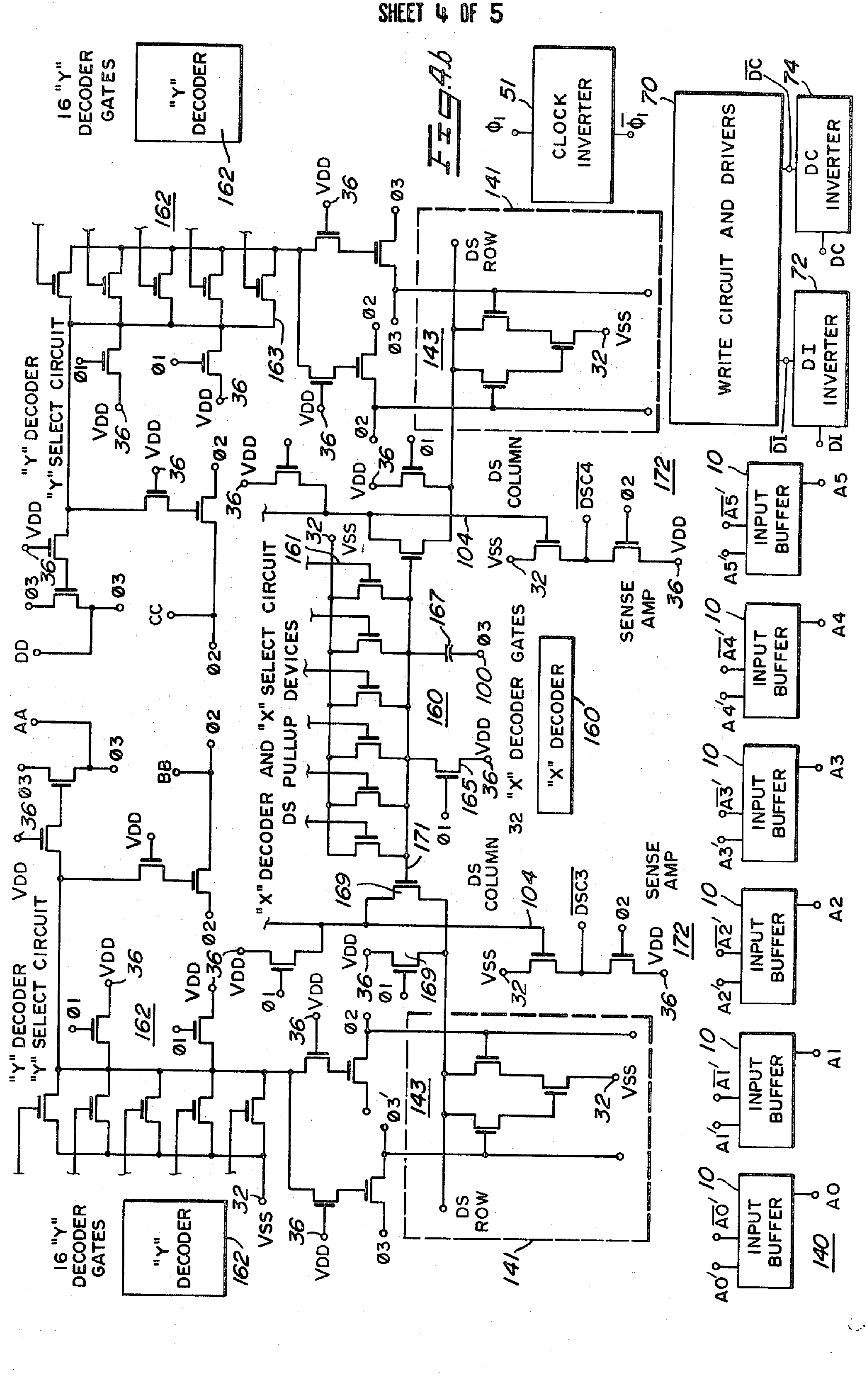
FIG. 4*b* is a continuation of the partial schematic diagram of FIG. 4*a*.

The preferred embodiment of the circuits of present invention is the 2,048 bit dynamic MOS RAM shown, schematically in FIGS. 4*a* and 4*b*. RAM 140 includes a storage array consisting of four 512 bit quadrants 141 of storage cells 143, each including three transistors 147, 149 and 150. Data control register 152 includes a data control storage cell 154, which shares vertical bus lines with all storage cells 144 in a particular column of the storage array. Data control register 152 provides as its output the DC signal bus 86, previously mentioned. Data control register storage cells 154 are identical in schematic configuration to the storage cells 144, although their device geometry ratios may be different. RAM 140 includes eleven address input buffer circuits 10, and an additional input buffer circuit 11 to be used as a chip select buffer circuit. The eleven input buffers have as inputs and eleven binary address inputs required to select one out of 2,048 bits. The output terminals 28 and 30 of the input buffers 10 supply the inputs to the X and Y decode circuits 160 and 162, respectively, wherein the binary combinations required for row and column selection are decoded. Two clock inverters 51 are included on the 2,048 bit RAM 140. The write circuit 70 is also duplicated for the upper and lower halves of the 2048 bit RAM 140, as are the data input inverter 72 and the data control inverter 74. The duplication of the write circuitry and the clock inverters in the preferred embodiment is to eliminate the stray capacitance of the long lines that would be required to extend the length of the chip, were the aforementioned circuits not duplicated, at a considerable sacrifice in speed of operation. In the upper left hand corner, the read circuit 70 is provided. The inputs to the read circuit are supplied by the four sense amps 172.

The "X" decoder circuits 160 each include six switch MOSFETs 161, which decodes the various combinations of the outputs of six of the input buffers 10 to select one out of 64 rows. Each "X" decoder circuit includes a load MOSFET 165 having its gate electrode connected to $\phi_1$ bus 13, and its source electrode connected to output node 171, and its drain node connected to $V_{DD}$ supply bus 36. Each output node 171 is connected to the gate electrode of two "X" select MOSFETs 169, which connect the digit-sense column bus (DS column) of the particular quadrant 142 to the digit-sense row bus (DS row) of the selected row of storage cells 143 within that quadrant. Those skilled in the art will realize that node 171 is not usually precharged to $V_{DD}$ volts (−15 volts) during the $\phi_1$ pulse, but rather to $V_{DD}$-$V_{TH}$ volts (i.e. approximately 11 volts). Thus, MOSFET 169 is not turned on as strongly as is desired, and circuit speed is reduced. According to the present invention, an enhancement capacitor 167 is connected between the $\phi_3$ bus 100 and the node 171. The gate electrode of the enhancement capacitor is connected to node 171, and the diffused electrode is connected to $\phi_3$ bus 100, so that during the $\phi_3$ pulse $T_{3PW}$ the node 171 of the selected row only is capacitively boosted by $\phi_3$, so that MOSFET 169 is turned on more strongly.

The operation of the write circuit 70 shown in FIG. 2a is best understood after a brief explanation of the inverting cell concept, which is made with reference to FIG. 6*a*, which shows a block diagram of a memory using inverting cells, and also in reference to FIG. 5, which illustrates the cells in more detail. In FIG. 6*a*, the essential components of the memory 180 are shown, including an array 182 of inverting storage cells, a data control register 184 of inverting storage cells, each of which shares control busses with a column of inverting storage cells. Also shown are an exclusive OR type sensing circuit 186 and an exclusive OR type write circuit 188. The essential feature illustrated is that the input-output circuitry of an inverting cell memory must include two exclusive OR functions. Referring to FIG. 5, it is seen that during the $\phi_2$ pulse $T_{2PW}$, the information capacitively stored on the storage node 145 is sensed, and the complement of the stored logic state appears on DS row line 151, since MOSFET 150 is turned on during $\phi_2$. During $\phi_3$, MOSFET 147 is turned on, the complement of the previously stored logic state is transferred therethrough back to storage node 145. Thus, the stored information has inverted. The data control register cell 154 also inverts the information stored on its capacitive storage node in the same manner. Thus, it is seen that the data control register keeps track of any inversion of information in storage cells in the same column. As the memory address locations are used in a random fashion, some account must be kept on the current status of a column, as to whether the column is inverted or not. This task may be performed by assigning a state to the data control cells, then by activating an exclusive OR between the data in the cell being sensed and the data of the selected column data control cell. To insure that the correct data is written, the input data is exclusive OR'ed with the data control cell before being placed on the selected digit-sense bus and being written. This concept is also illustrated in the logical truth table also shown in FIG. 6*b*. In the read cycle the storage cell data is compared with the data control cell data during $\phi_2$. For the write operation a comparison of input data ane the control cell data is performed during the delay between the $\phi_2$ pulse and the $\phi_3$ pulse. During the $\phi_3$ pulse $T_{3PW}$, correct data is written. Referring now to FIG. 2*b*, the operation of the write circuit 70 is explained. During $\phi_1$ the output node 82 of the data inverter 72 shown in FIG. 2*b* is precharged to approximately −15 volts. If the DI (data in, reference numeral 76) goes to a 0 volt level at point B on the DI waveform of FIG. 5, node 82 is discharged to +5 volts through MOSFET 78. Referring to FIG. 2*c*, during the $\phi_2$ pulse $T_{2PW}$, the data stored both in the storage cells 143 (FIG. 4*a*) and in the data control register cell 154 (FIG. 4*a*) are inverted so that the voltage of the data control signal bus 86 (DC) is established by the end of the $\phi_2$ pulse, and the ratio type inverter 74 provides the complement thereof ($\overline{DC}$) by the end of $T_{2PW}$. Referring to FIG. 2a, it is seen that during $T_{1PW}$, nodes 108 and 110 are precharged to approximately −15 volts. Referring to the read-write waveform in FIG. 5 and more specifically to point C thereof, it is seen that if the read-write (RW) signal terminal 148 is at +0 volts, then nodes 108 and 110 will be discharged to +5 volts through the devices 144 and 146, respectively, and the write operation will not occur. Similarly, if the chip is not selected by the chip select input CS, (refer to input buffer 11 of FIG. 5), then MOSFETs 140 and 142 will be turned on and nodes 108 and 110 will be discharged to +5 volts after the occurrence of the trailing edge of the $\phi_1$ pulse. Thus, writing information into an unselected chip cannot occur. If, at point B on the waveform of FIG. 2, the data input signal 76 (DI) goes to +0 volts, then $\overline{DI}$ signal bus 82 is discharged to +5 volts as previously explained, and MOSFETs 122 and 134 are off, while MOSFET 128 and MOSFET 118 are on. Assuming that at the end of $T_{2PW}$, data control signal (DC) 86 is at approximately −15 volts, then $\overline{DC}$ bus 92 is at +5 volts, and MOSFETs 124 and 130 are off, while MOSFETs 120 and 136 are on. Thus, there is no discharge path for node 110, while node 108 is discharged through "on" MOSFETs 116, 118 and 120 when $\phi_3$ goes to −15 volts. Also when $\phi_3$ goes to −15 volts during $T_{3PW}$, pull-down MOSFET device 96 is on and transmission gate MOSFET 102 is also on and DS column bus 104 is charged to approximately +5 volts, this level being logically representative of the TTL "one" level appearing on data input terminal 76. Next, for purposes of illustration, assume that the data input terminal 76 (DI) is at 0 volts after the time designated as point B on the timing diagram. Then MOSFETs 122 and 134 are on, and $\overline{DI}$ bus 82 is at approximately +5 volts during the write cycle, and MOSFETs 118 and 128 are also off. Thus, node 108 cannot be discharged during this write cycle, and stays at approximately −15 volts, assuming the same conditions on data control bus 86 (DC) as in the previous example, so MOSFETs 124 and 130 are off and MOSFETs 120 and 136 are on. Then node 110 cannot discharge to +5 volts and remains at −15 volts. However, MOSFETs 134 and 136 are on. Then, during $T_{3PW}$, MOSFET 126 is on, and node 110 is discharged to +5 volts, and during $T_{3PW}$ a voltage level approximately equal to −15 volts appears on DS column bus 104, since MOSFET 98 is on. This level will be written into the storage node of the selected cell, and is representative of the logical "zero" appearing on DI (data in) terminal 76. The operation of the exclusive NOR circuit 112 is analogous to exclusive OR circuit 114, except that the functions provided are logical complements during the $\phi_3$ pulse $T_{3PW}$. The inclusion of MOSFETs 126 and 116 in the exclusive OR circuits 112 and exclusive NOR circuit 114 is provided to eliminate a premature discharge of nodes 108 and 110 which could occur prior to $T_{3PW}$ if DI bus 76 is at 0 volts prior to the beginning of $T_{3PW}$. The operation of the write circuit for the other two combinations of DI and DC (i.e. when DC = +5 volts) are similar and are not included herein.

While this invention has been shown in connection with certain specific examples, it will be readily apparent to those skilled in the art that various changes in form and arrangement of parts may be made to suit specific requirements without departing from the spirit scope of the present invention.

What is claimed is:

1. An input buffer circuit coupled to first and second power supply terminals, a clock signal terminal, a clock complement signal terminal, an input signal terminal, and including in combination a dynamic latch circuit coupled to the clock complement signal terminal and first and second cross-coupling nodes thereof, the improvement comprising:

a first inverter coupled to the input signal terminal, the clock signal terminal, and the first cross-coupling nodes;

a second inverter coupled to the clock signal terminal and the input signal terminal, and;

a ratioless inverter coupled to the clock signal terminal, the output node of the second inverter and the second cross-coupling node, wherein only one of the first and second cross-coupling nodes may be discharged to the second power supply voltage during a delay between the trailing edge of a clock signal applied to the clock signal terminal and the leading edge of a clock complement signal applied to the clock signal terminal.

2. The input buffer circuit of claim 1 wherein the dynamic latch includes a first field-effect transistor, a second field-effect transistor, a third field-effect transistor, and a fourth field-effect transistor, the first field-effect transistor having its drain coupled to the clock complement signal terminal and its source coupled to a first output node and its gate coupled to the second cross-coupling node, the second field-effect transistor having its drain coupled to the first output node and its source coupled to the second power supply terminal and its gate coupled to the first cross-coupling node, the third field-effect transistor having its drain coupled to the clock complement signal terminal and its source coupled to a second output node and its gate coupled to the first cross-coupling node, and the fourth field-effect transistor having its drain coupled to the second output node and its source coupled to the second power supply terminal and its gate coupled to the second cross-coupling node.

3. The input buffer circuit of claim 1 wherein the first inverter includes first and second field-effect transistors, the fifth field-effect transistor having its drain coupled to the first power supply terminal, its gate coupled to the clock terminal and its source coupled to the first cross-coupling node, the second field-effect transistor having its drain coupled to the first cross-coupling node and its gate coupled to the input terminal and its source coupled to the second power supply terminal.

4. The input buffer circuit of claim 1 wherein the second inverter includes first and second field-effect transistors, the first field-effect transistor having its drain coupled to the first power supply terminal and its gate coupled to the clock signal terminal and its source coupled to a first node, and the second field-effect transistor having its drain coupled to the first node and its gate coupled to the input signal and its source coupled to the second power supply terminal.

5. The input buffer circuit of claim 4 wherein the ratioless inverter includes third and fourth field-effect transistors, the third field-effect transistor having its drain coupled to the first power supply terminal and a gate coupled to the clock signal terminal and its source coupled to the second cross-coupling node, and the fourth field-effect transistor having its drain coupled to the second cross-coupling node and its gate coupled to the first node and its source coupled to the second supply terminal.

* * * * *